Aug. 11, 1936.    F. X. MALOCSAY    2,050,712
WRAPPING AND BANDING MACHINE
Filed April 29, 1931    7 Sheets-Sheet 2
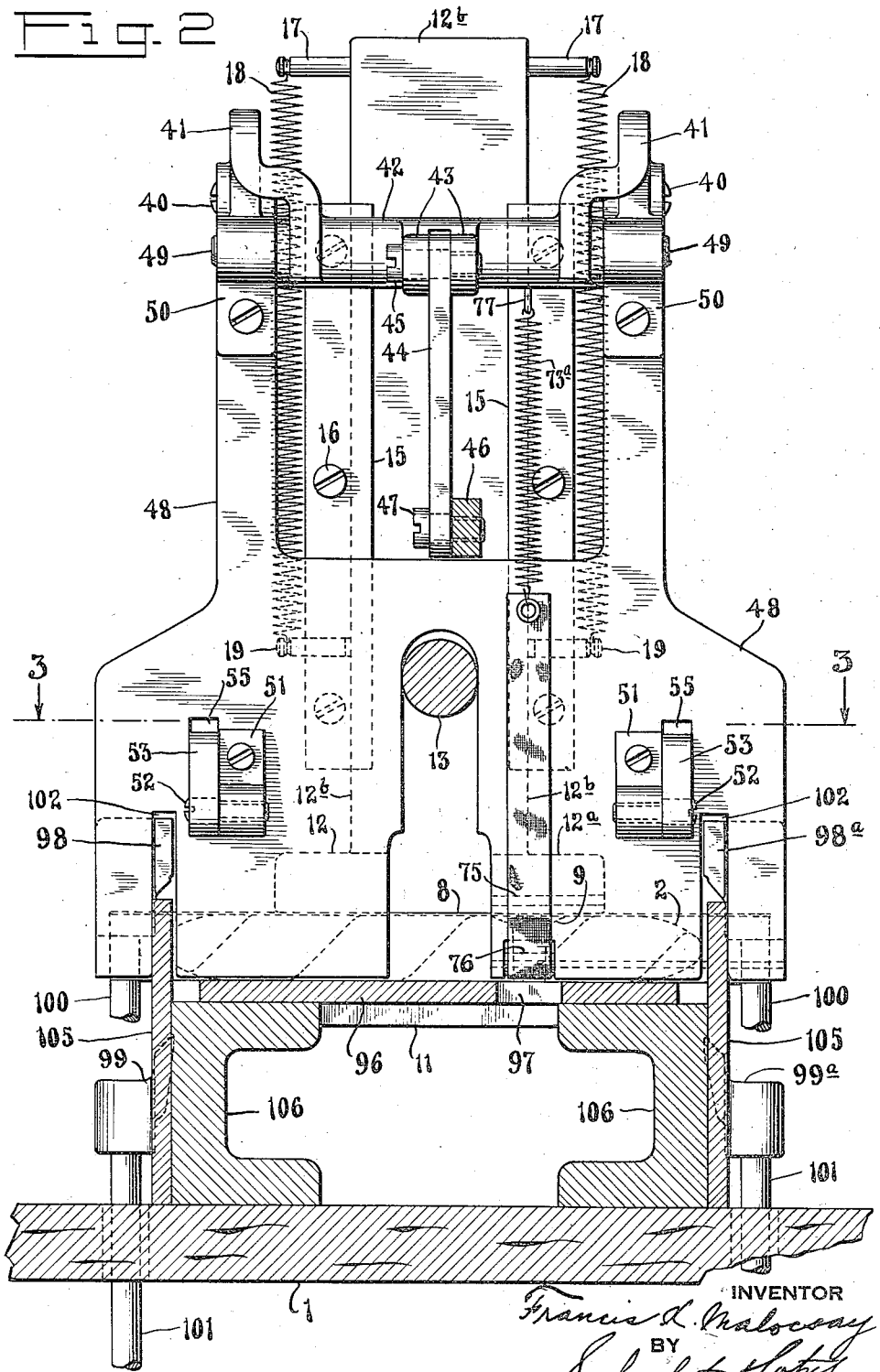

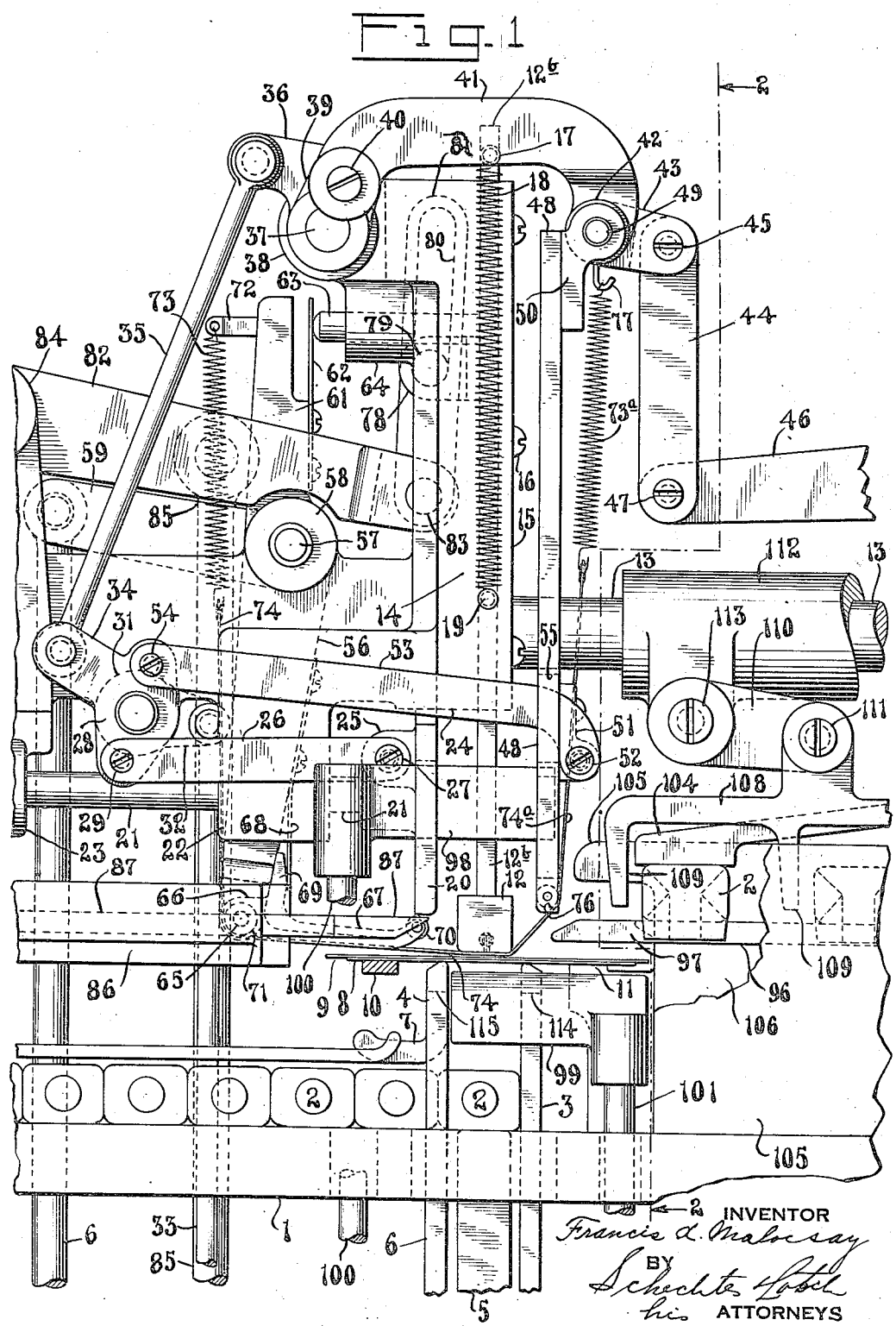

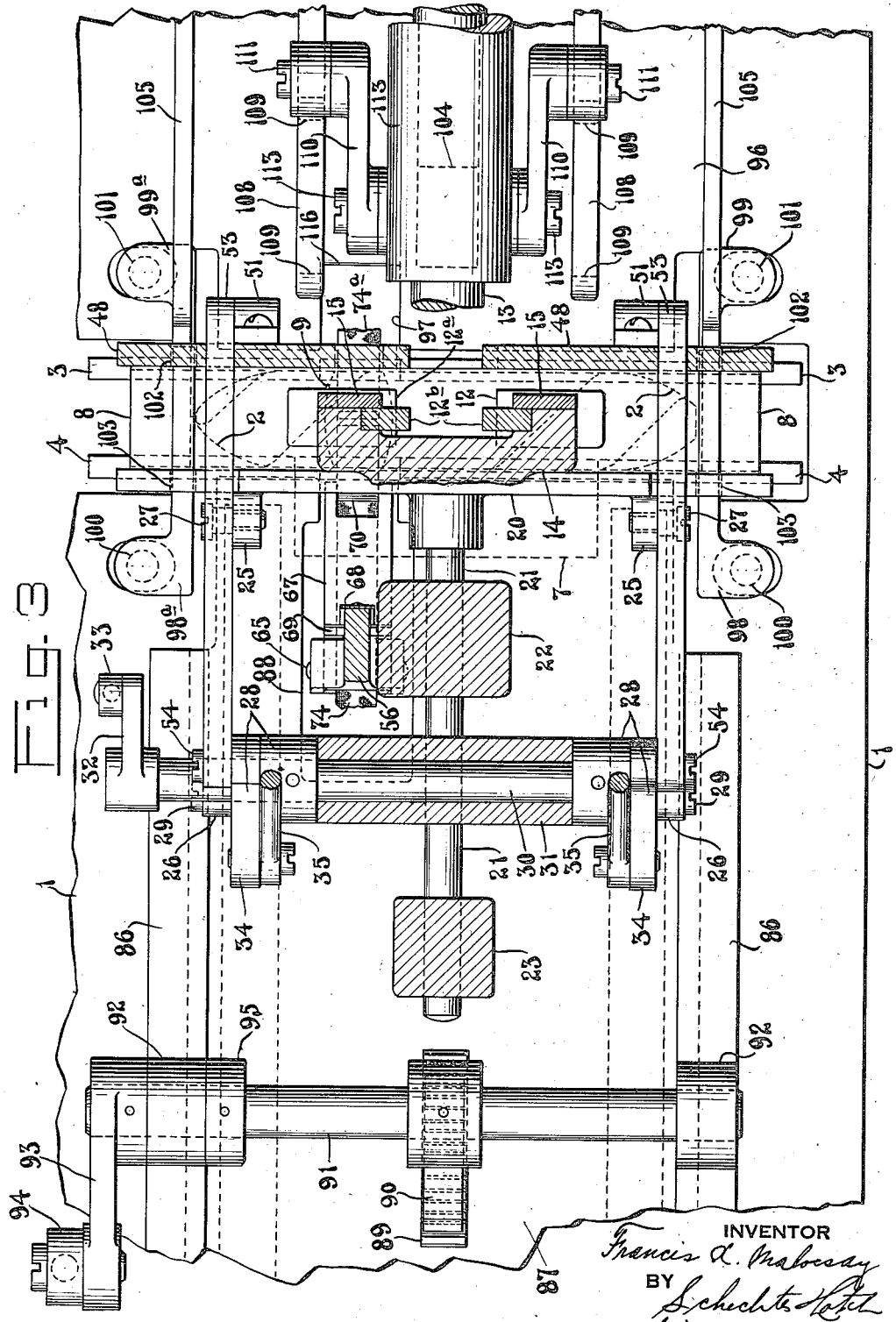

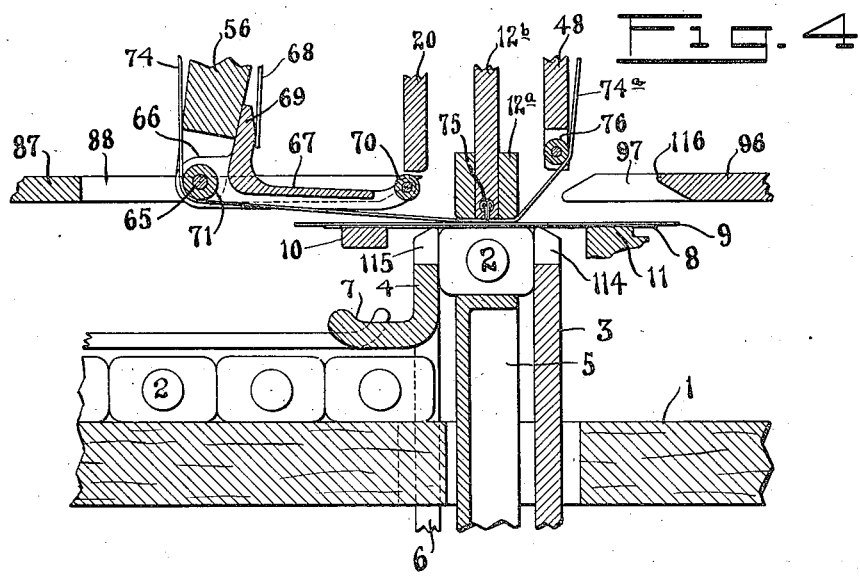
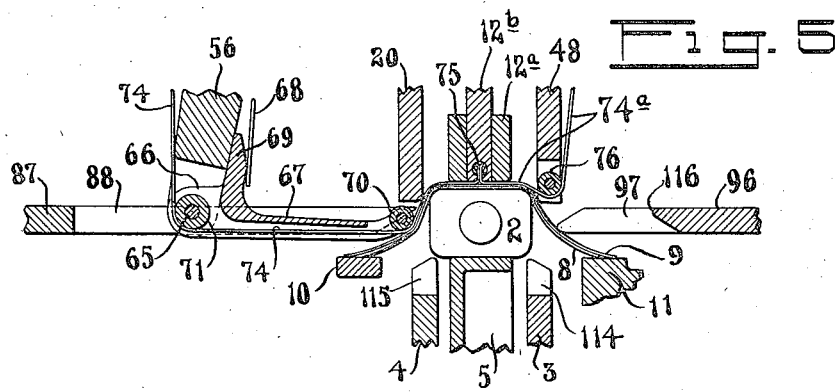
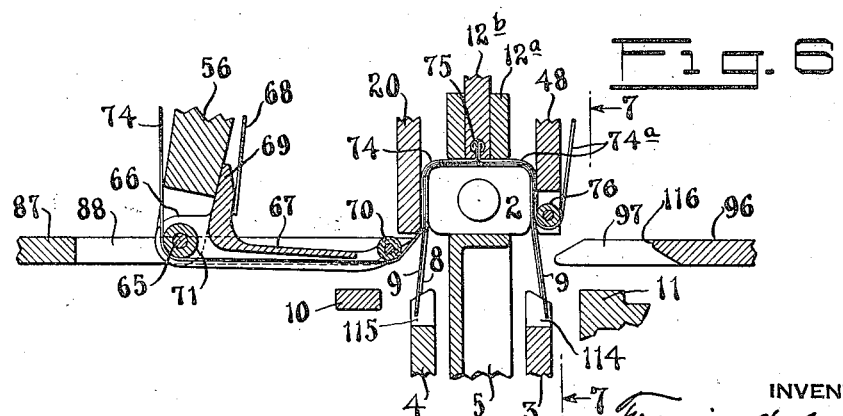

Aug. 11, 1936.  F. X. MALOCSAY  2,050,712
WRAPPING AND BANDING MACHINE
Filed April 29, 1931  7 Sheets-Sheet 5
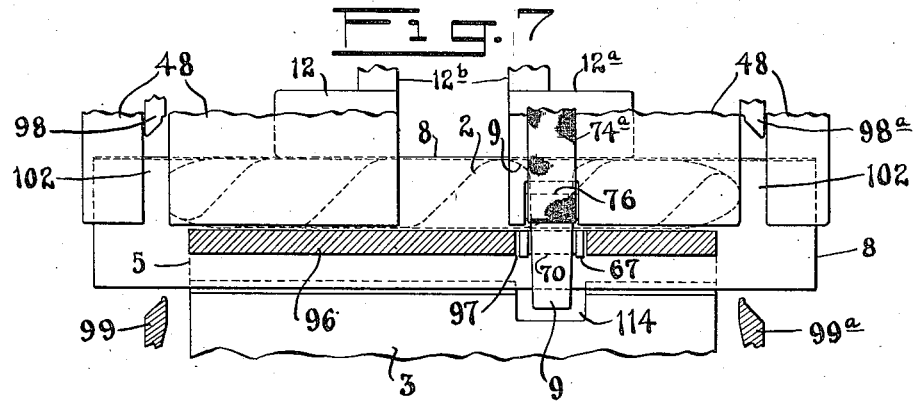
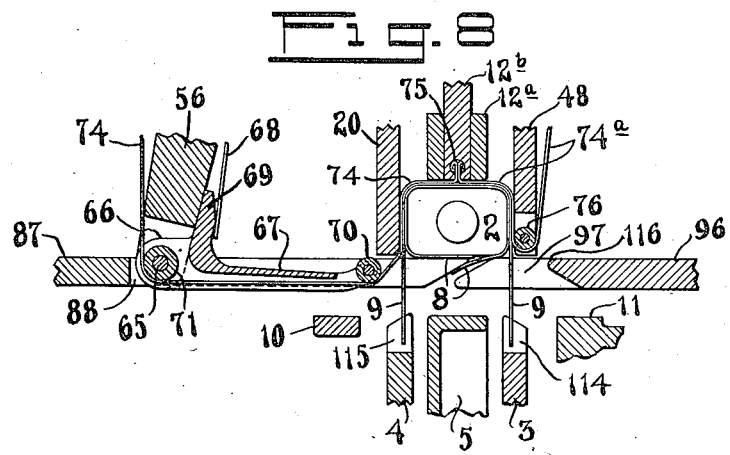
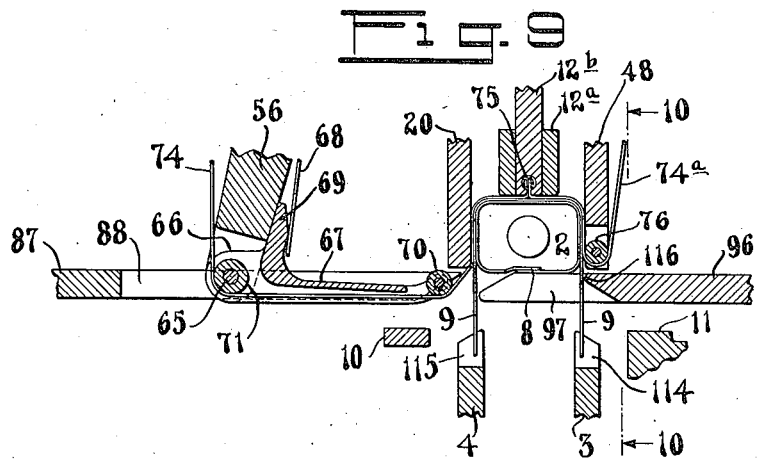
INVENTOR
Francis X. Malocsay
BY
ATTORNEYS Aug. 11, 1936.  F. X. MALOCSAY  2,050,712
WRAPPING AND BANDING MACHINE
Filed April 29, 1931   7 Sheets-Sheet 6
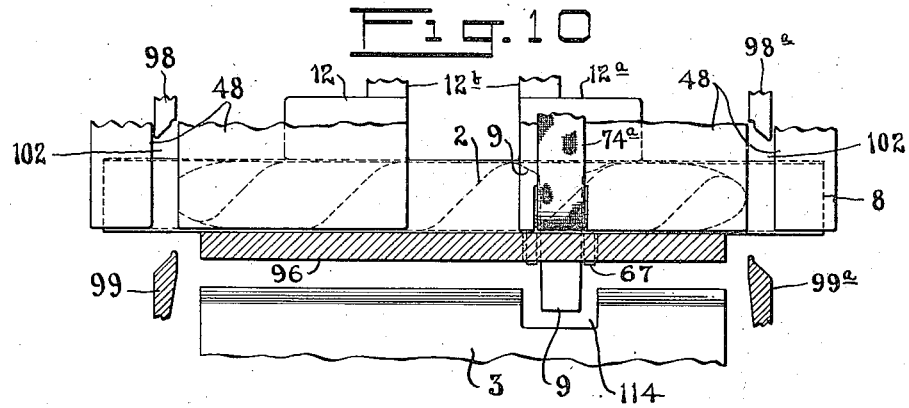
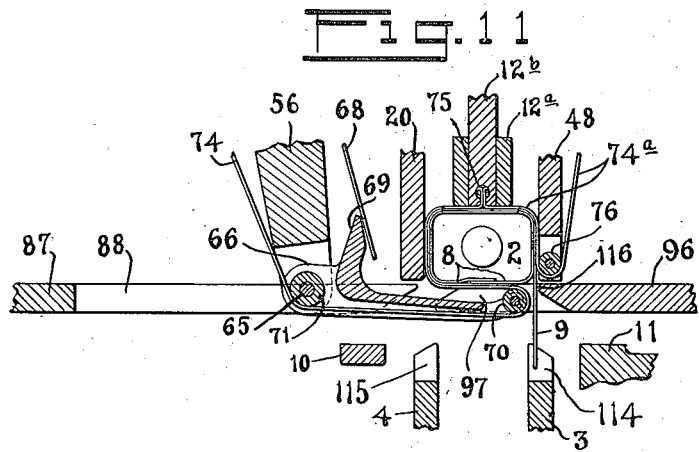
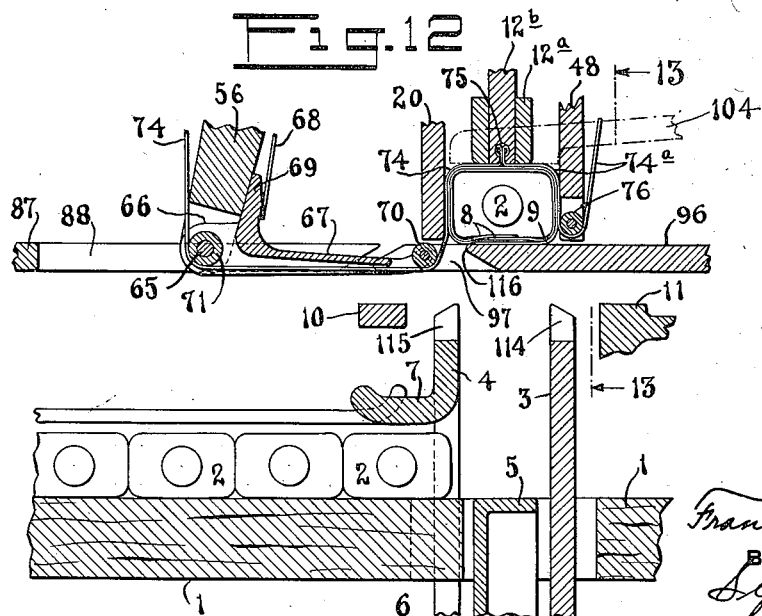

Aug. 11, 1936.   F. X. MALOCSAY   2,050,712
WRAPPING AND BANDING MACHINE
Filed April 29, 1931   7 Sheets-Sheet 7
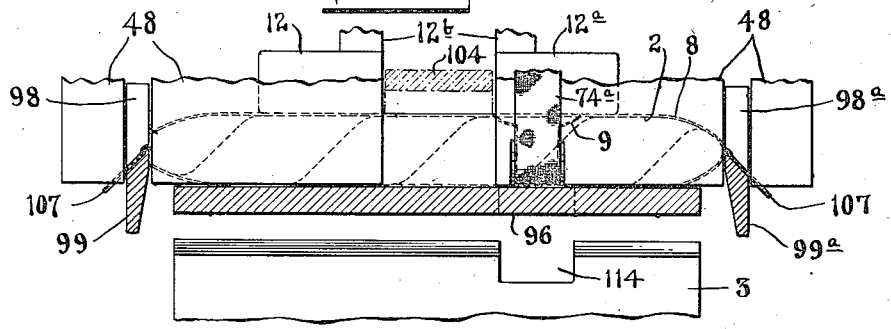
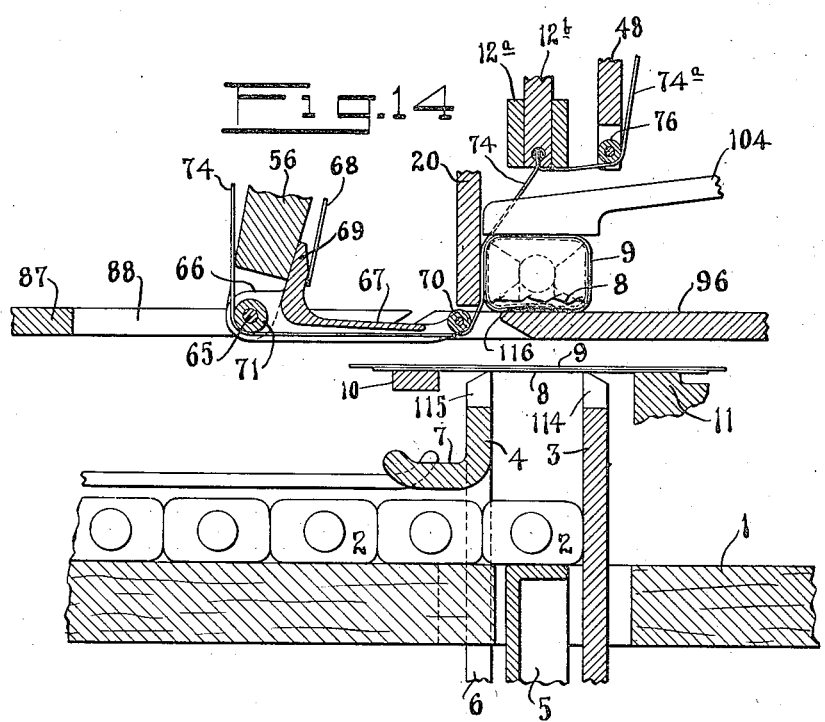
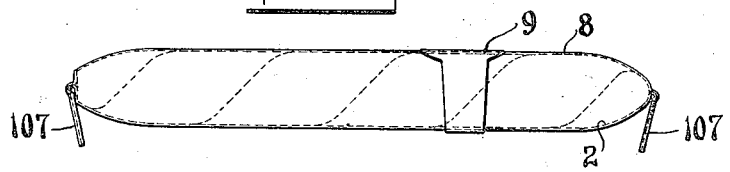
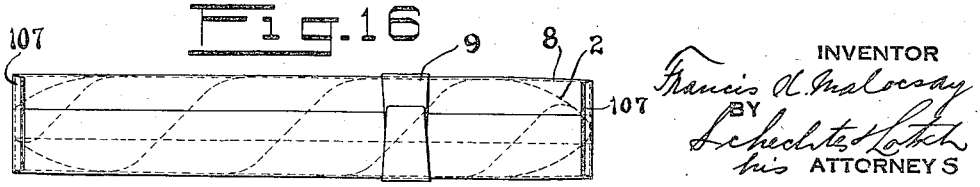
INVENTOR
Francis X. Malocsay
BY
Schechter Roth
his ATTORNEYS Patented Aug. 11, 1936

2,050,712

UNITED STATES PATENT OFFICE 2,050,712

WRAPPING AND BANDING MACHINE

Francis X. Malocsay, Upper Saddle River, N. J., assignor, by mesne assignments, to Consolidated International Corporation, a corporation of New York Application April 29, 1931, Serial No. 533,724

2 Claims. (Cl. 93—2)

This invention relates generally to article wrapping and banding machines, and while broadly applicable, is particularly concerned with the wrapping of cigars in "Cellophane" paper and the banding of said cigars.

It is among the objects of this invention to provide a wrapping and banding machine which will entirely wrap an article and secure a band around said wrapper, and which will automatically deliver said article to the wrapping and banding position, and which will automatically discharge said article after it has been wrapped and banded.

Another object of the invention is to provide a combination wrapping and banding machine which can be easily and quickly adjusted to entirely wrap an article and discharge it without securing a band around said article and wrapper, or, be so adjusted to discharge a banded but unwrapped article.

Another object of the invention is to provide a cigar handling mechanism which will place a wrapper and a band around a cigar in synchronous operation with a wrapper and band feed mechanism.

A further object of this invention is to provide a combination cigar wrapping and banding mechanism which will accommodate cigars of various shapes and sizes and which will be particularly adapted for synchronous cooperation with any of the conventional cigar feeding devices, commonly known as hoppers.

Another object of the invention is to provide a cigar wrapping and banding mechanism which will receive a wrapper and band placed one upon the other, and which will fold said wrapper around the cigar and then the band without moving the cigar to perform both folding operations.

Another object of the invention is to provide a wholly coordinated and combined assembly by which the foregoing objects are carried out in a novel, simple and improved manner and thereby increase the production and reduce the cost of wrapping and banding cigars.

Another object of the invention is to provide a wrapping and banding machine in which the entire operation is automatic and does not require human handling of the articles and which thus greatly reduces the amount of manual labor or supervision required.

A further object of my invention is to provide and construct in a single unit a combined wrapping and banding mechanism; that is, a machine which will at a certain definite and predetermined position perform the dual function of applying a wrapper and a band around a cigar. In the present practice two independent mechanisms are utilized; one for the purpose of applying the band, like that illustrated in my Patent No. 1,261,832, dated April 9, 1918, from which the cigars are conveyed to a wrapping mechanism where the wrapper is applied, like that disclosed in my copending application filed November 29, 1930, Serial No. 498,992. A cigar being a very brittle and fragile article, it can be easily crushed and its tobacco wrapper injured and destroyed, and in practice it has been found that where two mechanisms are utilized there is a great breakage of cigars because of the transportation from the banding mechanism to the wrapping mechanism. There is also a great wastage of bands and wrappers. These various objections have been overcome by my combined wrapping and banding mechanism.

Other more specific objects and advantages of the apparatus will appear as the nature of the improvements are better understood, the invention consisting substantially in the novel arrangement and corelation of instrumentalities herein fully described and illustrated in the accompanying drawings wherein similar reference characters are used to describe corresponding parts throughout the several views and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore is to be understood from an illustrative, rather than a restrictive standpoint. It will be understood that the various features of the invention may be separately applicable despite their cooperation herein shown.

In this specification no detailed description of the operation of the wrapper and band feed mechanisms will be made as those mechanisms will be the subject of another patent application, and no detailed description of the operation of the cigar feed or hopper mechanism will be made, as this type of mechanism is fully described and illustrated in my Patent No. 1,653,641, dated December 27th, 1927, and in my applications, Serial Number 492,437, filed October 31, 1930, on Cigar banding machines; Serial Number 519,347, filed March 2, 1931, on Cigar handling machines; and Serial Number 526,788, filed April 1, 1931, on Cigar machines.

In the embodiment of the invention as herein disclosed there is provided a table, upon the top of which the cigars are fed from a hopper which is not shown in the drawings, but which would be located at the left hand side of Fig. 1 and operated in a synchronous manner with the wrapping and banding operation. The cigars move with an intermittent movement. The rest periods between the forward movements of the cigars being equal to one complete cycle of the wrapping and banding mechanism. The cigars are guided upward between adjustable guides by a plunger. This upward movement causes the wrapper and band to be folded around three sides of the cigar with the aid of certain automatically adjusted side plates. The cigar is held in this position while the wrapper and band are folded around the fourth side of the cigar. At the completion of this operation, the ends of the folded wrapper which extend beyond the ends of the cigars are folded together and bent downward which completes the wrapping and banding of the cigar. All of the parts which comprise this wrapping and banding mechanism are driven directly or indirectly from a common drive mechanism which is not shown in the drawings as it forms no part of this invention and would also serve to drive the cigar, wrapper and band feed mechanism with which it will cooperate.

The combination wrapping and banding mechanism illustrated in the accompanying drawings will function in the same manner as described hereinafter whether it is to be utilized purely as a cigar wrapping mechanism or a banding mechanism. The wrapper and band feed mechanisms, although not shown, will be located directly behind the wrapping and banding mechanism and in such order that the band will be placed upon the wrapper. These mechanisms, as stated above, are driven from a common source, and it is at this point that a simple and effective clutch or transmission is located to transmit the power to these mechanisms. By manipulation of this clutch or transmission the wrapper feed mechanism can be quickly thrown out of operation and a banded and unwrapped cigar will be ejected, and likewise, by throwing the band feed mechanism out of operation, a wrapped but unbanded cigar will be ejected. With these adjustments in mind, it is readily seen that should it be so desired, cigars could first be banded and then fed through the mechanism a second time to be wrapped. This method of operation places the band directly around the cigar instead of around the wrapper. I also wish to state at this time that this mechanism is also applicable to that type of wrapper for a cigar upon which a facsimile of a band has been printed, said type of wrapper being fully described in my copending application filed March 31st, 1931, Serial No. 526,632.

In connection with the features hereinafter specifically pointed out, and in addition to the many unique and improved structural combinations, the invention is also concerned with the specific mechanical means by which the various advantageous functions are achieved; said mechanical means being combined to provide an automatic, simple, inexpensive, rugged and durable apparatus.

The inventive idea involved is capable of receiving a variety of mechanical expressions, one of which for the purpose of illustration is shown in the accompanying drawings, in which—

Fig. 1 is a front elevation, partly broken away, of my improved wrapping and banding mechanism;

Fig. 2 is a sectional view taken on the line 2—2 of Fig. 1;

Fig. 3 is a sectional plan view taken on the line 3—3 of Fig. 2;

Fig. 4 is a detail sectional view illustrating the position of the folding or wrapping and banding elements at the start of the wrapping operation;

Fig. 5 is a detail sectional view illustrating the position of the wrapping and banding elements during the first step of the wrapping and banding operation;

Fig. 6 is a similar view illustrating the completion of the first wrapping and banding step;

Fig. 7 is a sectional side view taken on the line 7—7 of Fig. 6; which illustrates the position of the end folders with respect to the wrapper when it is in the position shown in Fig. 6;

Fig. 8 is a detail sectional view illustrating the beginning of the second step of the wrapping operation which shows how the wrapper is folded around the bottom of the cigar;

Fig. 9 is a similar view which illustrates the completion of the operation of folding the wrapper around the cigar;

Fig. 10 is a sectional side view taken on the line 10—10 of Fig. 9 which illustrates the position of the lower end folders after the wrapper has been folded under the cigar as shown in Fig. 9;

Fig. 11 is a detail sectional view illustrating the first part of the step of folding the ends of the band under the cigar;

Fig. 12 is a similar view illustrating the completion of this banding step.

Fig. 13 is a sectional side view illustrating the end folding of the wrapper;

Fig. 14 is a detail sectional view illustrating the position of the parts prior to the ejecting of the wrapped and banded cigar, and a second cigar with its wrapper and band in position;

Fig. 15 is a side view illustrating the completely wrapped and banded cigar; and Fig. 16 is a bottom view of Fig. 15.

With particular reference to Figs. 1, 2 and 3, numeral 1 represents a table upon which my wrapping and banding mechanism is mounted, an upon which the cigars 2 are moved toward said mechanism from a cooperating hopper not shown, but which is also mounted upon the table. The cigars move forward with an intermittent movement from the hopper upon a conveyor; the surface speed of which is slightly greater than is necessary to feed the cigars up to the wrapping and banding position as shown in Fig. 1, and it is because of this that any space between the individual cigars is gradually eliminated, and the cigars kept in close contact with one another as they approach the wrapping and banding mechanism. A slight slippage between the cigars and the conveyor insure their close contact and prevent jamming. The first cigar is brought into contact with a centering plate 3 which protrudes upward through the table and in the path of the cigars as shown in Fig. 1. This centering plate 3 is linked to the centering plate 4 at its lower extremities (not shown) in such a manner to insure equal spread of these plates when the plunger 5 pushes the cigar upward between them as illustrated in Fig. 4. The centering plate 4 has the downwardly extending legs 6 to which the plate 4 is linked, and which are far enough apart to allow the cigars to pass between them. The outwardly extending flange 7 is integral with the plate 4 and acts as a guide.

Lying across the top edges of the centering plates 3 and 4 is the cigar wrapper 8 and the band 9. The outer ends of the wrapper and band are supported by the supports 10 and 11. Directly above the wrapper and band, and centrally located between the two centering plates is a plunger comprised of the two feet, 12 and 12a and the slide plate 12b, the center of which is cut away to span the rod 13, which is clearly illustrated in Fig. 2. The plunger 12 is slidably mounted in a guide comprised of the upwardly extending bracket 14 and the retaining plates 15 which are held in position by the screws 16. Extending outward from sides of the plunger slide plate 12b and located at its uppermost extremity are the spring supporting pins 17. (See Figs. 1 and 2.) Around the ends of these pins and in suitable grooves are hooked the light coil springs 18, the lower ends of which are secured in suitable grooves in the ends of the anchor pins 19 which are carried in the casting 14. The purpose of these springs is to push the plunger downward with just enough force to prevent the wrapper and band from slipping when a cigar is pushed upward into the position as illustrated in Fig. 5.

Located at the left hand side of the plunger 12 (Fig. 1) is the plate 20 which is mounted upon the rod 21 slidably mounted in the bearings 22 and 23 which are a part of the bracket 14, and the top surface of said plate is in sliding contact with the machined bottom surface 24 of the bracket 14 which prevents the plate from turning about the axis of its supporting rod 21. Integral with the rear surface of the plate 20 and located near the ends of which, are the lugs 25 to which are hinged the connecting links 26 by means of the shouldered screws 27. (See Figs. 1 and 3.) The opposite ends of these links 26 are hinged to one side of the toggle levers 28 by the shouldered screws 29. The toggle levers are pinned securely upon the shaft 30 mounted in the bearing 31, integral with a portion of the bracket 14. The shaft 30 extends beyond the rear toggle lever as illustrated in Fig. 3, and upon this extension is secured the lever 32. Fastened to the end of this lever is the push rod 33 which is moved up and down by a cam which is part of the band feed mechanism not shown in the drawings. Fastened to the extensions 34 of the toggle levers 28 are the connecting rods 35; the upper ends of which are connected to the lever 36 secured upon the shaft 37. The shaft 37 is carried in the bearing 38 integral with the top of bracket 14 (Fig. 1) and has secured to its outer ends, the arms 39. Hinged to these arms by means of the screws 40 are the connecting arms 41 of the bell crank 42. Integral with the center of the bell crank 42 are the lugs 43, between which is connected the link 44 by means of the pivot screw pin 45. The lower end of link 44 is connected to the lever 46 by the pivot screw 47. The lever 46 is mechanically connected to a cam, not shown, which is part of the main drive mechanism. The bell crank 42 is secured to top of the plate 48 by means of the shaft 49 and the bearing blocks 50. Hinged to the plate 48 are the connecting links 53. These links pass through suitable apertures 55 cut in the plate and are connected to the hinge blocks 51 by the screw pins 52. The other ends of the connecting links 53 are connected to the toggle levers 28 by the screw pins 54. The combination of links 26 and 53, the toggles 28, the links 35, arms 36, levers 39 and bell crank 42 impart a parallel movement to the plates 20 and 48 when the push rod 33 is actuated, the purpose of which is more fully described hereinafter.

The rocker arm 56 is supported on the pin 57 mounted in the boss 58 of the bracket 14 (see Fig. 1). Secured upon a rearwardly extending portion of the shaft 57 is the lever 59 to which is connected the push rod 60 which extends downward and is mechanically connected to a cam, not shown, but which is part of the main drive mechanism. The upper end 61 of the rocker arm 56 has secured to it the flat spring 62; the purpose of which is to exert a pressure upon the plunger retaining pin 63, slidably mounted in the boss 64 of bracket 14 when the lower end of said rocker arm is swung in a clockwise direction as illustrated in those steps of the wrapping and banding operation shown in Figs. 6, 8 and 9. This pressure against said pin 63 causes it to bear against the plunger slide plate 12b which holds it in position against the pull of the coil springs 18 when the plunger 5 moves downward and away from the bottom of the cigar.

Hinged to the lower end of the rocker arm 56, by means of the pin 65 and the lugs 66, is the finger 67. This finger is held in its normal position as shown in the various views by the flat spring 68 pressing against the tongue 69 integral with said finger; said flat spring being secured to the rocker arm 56. Suspended between two projections which form the front end of the finger 67 is the roller 70, and suspended upon the pin 65 and located between the lugs 66 is the roller 71, the purpose of these rollers and the finger being fully described hereinafter.

Driven into the upper end 61 of the rocker arm 56 is the anchor pin 72 to which is hooked the light coil spring 73. (See Fig. 1.) To the lower end of this coil spring is hooked the fabric tape 74 which passes around the roller 71 and between the side flanges of the finger 67 to the under side of the plunger foot 12a where it is anchored by pushing its rolled and sewed end into the slotted hole 75 for that purpose, which is clearly illustrated in Fig. 4. Also anchored in this same slotted hole 75 is the rolled and sewed end of the fabric tape 74a which passes under the plunger foot and around a roller 76 carried in a cut-out portion in the bottom of the pressure plate 48. The upper end of this tape 74a is hooked to the coil spring 73a which is similar to coil spring 73, the upper end of which is anchored to the hook 77 which is fastened in the bell crank 42.

Secured to the plunger slide plate 12b (see Fig. 1) is the bracket 78 having the pin 79 engaging in the slot 80 of the pusher link 81 which is connected to the lever 82 by means of the pin 83. The lever 82 is pivotally connected to the bracket 84 which is fastened to the extension of bracket 14. Also connected to the lever 82 is the push rod 85 which is mechanically connected to a cam, not shown, which is a part of the main drive mechanism. The purpose of this push rod, lever link and bracket is to move the plunger, comprising the feet 12, 12a, and slide plate 12b upward to allow the completely wrapped and banded cigar to be easily removed as illustrated in Fig. 14. The lever 46 with its link 44 is provided to raise the plate 48 for the same purpose, which is also illustrated in Fig. 14.

Slidably mounted in side frames 86 is the folder plate 87, which is apertured at 88 (see Fig. 3) to allow for proper positioning of the finger 67 and to allow for free movement between the rocker arm 56 and said plate as illustrated in Fig. 8. A further object of said aperture 88 will be more fully described hereinafter. Toward the rear of the folder plate 87 and centrally located (see Fig. 3) is secured the gear rack 89 which engages with the gear sector 90 pinned upon the shaft 91 mounted in the bearings 92 which are integral with the side frames 86. Upon the rear end of the shaft 91 is secured the arm 93 to which is connected the push rod 94. This rod is mechanically connected to a cam which is not shown, but which is a part of the main drive mechanism of the machine. The collar 95 on shaft 91 prevents the shaft from sliding and thereby preventing the rack and gear sector from disengaging. An up and down movement applied to the push rod 94 by its operating cam causes the folder plate 87 to move forward and backward in proper synchronization with the rest of the mechanism.

Opposite the folder plate 87, and on the same level with it, is the folder plate 96, which is slidably mounted in a suitable guide to allow it to be freely moved forward and backward by a rack and gear sector (not shown), but which is similar to that described in connection with folder plate 87, but in this instance the rack and gear sector is located underneath the folder plate to allow the completely wrapped and banded cigars to be ejected along its top surface as illustrated in Fig. 1. The front of the said folder plate 96 is slotted as at 97 (see Figs. 2 and 3) and this slot is located directly opposite the opening 88 in folder plate 87. The width of said opening 88 at the front of the plate and the width of slot 97 is such to allow the ends of the greatest width of bands to be used to pass therein. The purpose of these openings will be more fully described hereinafter.

Referring to Figs. 1, 2 and 3 and more in particular to the latter two, it will be seen that there are two pairs of wrapper end folders. The top folders are designated by the numerals 98 and 98a, and the lower folders by the numerals 99 and 99a. The top folders 98 and 98a are supported on the rods 100, and the folders 99 and 99a are supported on the rods 101; all of said rods pass downward through the table 1, below which each pair is actuated by its independent cam, not shown in the drawings, but which will actuate them in a synchronous manner with the rest of the mechanism as said cams are a part of the main drive mechanism. The end folders are free to move up and down in slots 102 cut in the plate 48 and the slots 103 cut in the plate 20. (See Figs. 2 and 3.) The lower edges of the top folders are beveled and grooved to correspond to a level and bead on the top edges of the lower folders (see Fig. 13) the purpose of which will be more fully described hereinafter.

When the cigars are completely wrapped and banded, they are ejected from the wrapping and banding position by the ejector finger 104 and the backward movement of the folder plate 96. The ejector finger receives its movement by means of a combination of levers which are actuated by a cam forming part of the main drive which is not shown in the drawings. As the wrapped and banded cigars are ejected they are guided between the guides 105 which are secured to the channels 106. (See Figs. 1 and 2.) The guides 105 prevent the folded down ends 107 of the wrapper (see Figs. 13, 15 and 16) from springing outward as they are moved away from the wrapping and banding mechanism by the reciprocating members 108 (Figs. 1 and 3) which have integral with it the downwardly extending prongs 109. These reciprocating members are connected to the links 110 by pivot screws 111, and said links are connected to the carrying member 112, which is slidably mounted on the shaft 13, by the pivot screws 113. The reciprocating members 108 also receive their motion from the main drive mechanism, and their operation will be more fully described herein.

Having thus described my invention in detail, I will now describe its operation.

Referring to Fig. 1 it will be seen that the first cigar has been moved up into contact with the centering plate 3, and upon the plunger 5 by a cooperating feed mechanism and the wrapper and band have been fed into position by cooperating wrapper and band feed mechanisms which are not shown. As the cycle of operation starts, the plunger 5 moves the cigar upward, and as the upper left hand edge of it touches the rounded corner formed by the centering plate 4 and its flange 7, this centering plate 4 is pushed toward the left. This movement causes the centering plate 3 to move toward the right an equal distance due to their being connected by a parallel movement mechanism. As the plate 3 moves away, the cigar slides toward it due to the pressure exerted against the plate 4, and this action continues until the distance between the two plates is equal to the width of the cigar. This action absolutely centers the cigars and automatically takes care of any variation. As the plunger 5 continues to move upward it pushes the top surface of the cigar into contact with the wrapper 8, the band 9 and the pressure plunger feet 12 and 12a as illustrated in Fig. 1. The continued movement of the plunger 5 causes the cigar to force the presser plunger upward against the compression of the coil springs 16 as illustrated in Fig. 5. This action causes the wrapper to be firmly gripped between the presser plunger feet and the top of the cigar, and the band to be firmly gripped by the rough surface of the fabric tapes 74 and 74a secured in the bottom of presser plunger foot 12a, to prevent its slipping on the smooth surface of the wrapper. Thus the wrapper and band will be held in perfect alignment on the cigar as the continued upward movement of the plunger 5 pushes them into the wrapping and banding position illustrated in Fig. 6. During this movement the wrapper and band have folded around three surfaces of the cigar as shown, the side plates 20 and 48 having forced them downward tightly against the sides of the cigar, with the edges of the wrapper resting against the beveled tops of the centering plates 3 and 4, and the ends of the band extending into the slots 114 and 115 of the plates 3 and 4 respectively as illustrated in Figs. 6 and 7. It will also be noted that the fabric tapes 74 and 74a have also been forced upward with the cigar, wrapper and band, thus insuring against any possibility of the band slipping, and the extra amount of each tape required for this part of the operation was drawn around the rollers 70, 71 and 76, against the tension of their coil springs 73 and 73a which are provided partly for this purpose and to keep the tapes taut during all stages of the operation. Referring again to Fig. 6 it will be seen that the rocker arm 56 has been swung slightly in a clockwise direction and due to this movement, the spring 62 secured to its upper end 64, has pressed against the plunger retaining pin 63 (Fig. 1)

which in turn is forced against the plunger plate 12b to hold the presser plunger in position against the pull of its coil springs 18 when the plunger 5 moves downward prior to the action of folder plates 87 and 96 as illustrated in Fig. 8.

This holding of the presser plunger in position does not prevent the cigar with its wrapper and band from being dislodged, but merely helps by eliminating the pull of the spring 18; the actual gripping of the cigar, wrapper and its band being performed by the side plates 20 and 48. They are moved toward one another, thereby creating a slight squeezing action against the sides of the cigar to overcome the pull of the coil springs 73 and 73a on the tapes 74 and 74a respectively. This squeezing action is applied by a slight counterclockwise turning of their toggle levers 28. It might be well to mention at this time that the space between the side plates 20 and 48 is automatically adjusted to take care of various widths of cigars; and this adjustment is made by a cooperating band feed mechanism, which is not shown, when it is adjusted to accommodate the length of band to be used. This adjustment is transferred to the toggle levers 28 by a mechanical connection from the band feed to the toggle push rods 33. If a long band is to be used, the push rods 33 will be pulled downward which will spread the plates 20 and 48 further apart, and if a short band is to be used, the push rods will be moved upward, which would bring the plates closer together. In addition to this adjustment at the band feed, there is also a cam action which will always force the push rods upward to create the squeeze action between the plates at the proper time during the cycle of operation.

Referring now to Fig. 8 it will be seen that the plunger 5 has started on its downward course and the folder plates 87 and 96 have moved toward one another. These plates do not move simultaneously. Their movements are as follows, considering them to be in their normal positions as illustrated in Fig. 6. When the plunger 5 starts to move downward, the folder plate 87 starts to move inward and its beveled edge folds the edge of the wrapper under the cigar (Fig. 8). As the folder moves forward, the downwardly extending end of the band passes into the opening 88, leaving it undisturbed. At the completion of this movement, the folder plate 96 starts to move inward, the other end of the band entering the slot 97. When this folder has reached the position illustrated in Fig. 8, the folder 87 starts to recede as the folder 96 continues to proceed until both folders take the position illustrated in Fig. 9, which completes the folding of the wrapper around the cigar. During this folding operation, the bottom end folders have moved up to the position illustrated in Fig. 10. This view also clearly illustrates the position of the end of the band in the slots 97 and 114.

At this point in the cycle of operation, with the folders in the position as shown in Fig. 9, the rocker arm 56 is moved in a counter-clockwise direction until it has reached the position illustrated in Fig. 11. This movement of the rocker arm releases the presser plunger, but the downward pull of its springs 18 cannot dislodge the partly wrapped and banded cigar because the side plates 20 and 48 are still squeezing against it, and they in turn are aided in retaining the cigar in position by the folder 96 which has passed partly underneath it. The movement of the rocker arm has moved the band folder finger forward. This movement causes the roller 70 to press the fabric tape 74 against the end of the band, forcing it upward tightly against the already folded wrapper, said upward pressure of the roller being obtained from the spring 68 which presses against the tongue 69. When the finger has reached the limit of its movement as illustrated in Fig. 11, it immediately starts to recede with the folder plate 96 following it until the parts take the position shown in Fig. 12, the folder plate 87 having moved backward beyond its normal position to accommodate the folder 96. During the forward movement of the folder plate 96, the beveled edge 116 which forms the rear of the slot 96, came into contact with the band and forced it tightly upward against its other end which was placed in position by the finger. This last folded end of the band is the gummed end which was moistened before the band was fed into position and the pressure of the folder plate 96 securely seals the two ends of the band together. While this banding operation was taking place, the plunger 5 moved down to its normal position (Fig. 12) and the ejector finger 104 has been moved forward and down upon the top of the wrapped and banded cigar. During this operation, the end folders 98, 98a and 99 and 99a have been brought together as illustrated in Fig. 13. These folders press simultaneously against the top and bottom surfaces of the ends of the folded wrapper, and as they continue to move toward one another, bringing these surfaces with them, the side surfaces collapse inwardly because the side plates 20 and 48 prevent them from going outward. This makes what is known as a bellows fold which is tightly squeezed together by the beveled edges of these end folders, the beads and grooves of which pinch and score the wrapper. This pinching and scoring causes the folded ends to spring inward toward the cigar as illustrated in Fig. 15 when the folders release them.

Referring to Fig. 14 it will be seen that the pressure plunger and the side plate 48 have been raised, a new wrapper and band have been brought into position, and another cigar has been moved into position over the plunger 5. The presser plunger and side plate have been raised to allow the ejector finger and the folder plate 96 to remove the wrapped and banded cigar when they return to their normal positions illustrated in Fig. 1, carrying the cigar with them. The presser plunger is raised by the slotted link 81 engaging the pin 79 of the bracket 78, said link being actuated by the lever 82 and the push rod 33. The side plate 48 has been raised by the movement of the lever 46.

When the completely wrapped and banded cigars move into the ejected position illustrated in Fig. 1, the reciprocating members are in a raised position. They are then lowered and pulled toward the right, the prongs 109 gripping behind the cigars move them along until the last ejected cigar reaches the position of the previously ejected cigar.

In accordance with the provisions of the patent statutes, I have described my invention, but I desire it understood that it is not confined to the particular form shown and described, the same being merely illustrative, and that the invention can be carried out in other ways without departing from the spirit of my invention, and therefore, I claim broadly the right to employ all equivalent instrumentalities coming within the scope of the appended claims, and by means of which, objects of my invention are attained and new results accomplished; as it is obvious that the particular embodiments herein shown and described are only some of many that can be employed to attain these objects and accomplish these results.

Having now described my invention, what I claim and desire to secure by Letters Patent, is:

1. In a machine of the character described, means for delivering an article to a wrapping and banding position, means for positioning a band superimposed upon a wrapper above said article, means to press said article against said band on the side of said wrapper opposite to said band, means to fold said wrapper and said band circumferentially around said article and means to retain the ends of said band until the circumferential folding of said wrapper is completed.

2. In a machine of the character described, means for elevating an article to a wrapping and banding position, means for positioning a band superimposed upon a wrapper above said article, means to drape said wrapper and band over the sides of said article as the latter is elevated to said position, means to fold said wrapper beneath said article, and means to fold said band beneath said article, said band folding means operating when the folding of the wrapper has been completed.

FRANCIS X. MALOCSAY.